United States Patent [19]
Garrigues et al.

[11] Patent Number: 5,639,100
[45] Date of Patent: Jun. 17, 1997

[54] METAL GASKET

[75] Inventors: Jean-Claude Garrigues, Pont de la Maye; René Laulhé, Villenave d'Ornon, both of France

[73] Assignee: KSB Aktiengesellschaft, Frankenthal, Germany

[21] Appl. No.: 495,416

[22] PCT Filed: Jan. 5, 1994

[86] PCT No.: PCT/EP94/00012

§ 371 Date: Jul. 7, 1995

§ 102(e) Date: Jul. 7, 1995

[87] PCT Pub. No.: WO94/16247

PCT Pub. Date: Jul. 21, 1994

[30] Foreign Application Priority Data

Jan. 7, 1993 [DE] Germany ............ 43 00 191.2

[51] Int. Cl.$^6$ ........................................ F16J 9/06
[52] U.S. Cl. ................. 277/164; 277/207 A; 277/236
[58] Field of Search .......................... 277/163, 164, 277/207 A, 236, 105, 180, 235 A

[56] References Cited

U.S. PATENT DOCUMENTS

| | | | |
|---|---|---|---|
| 3,879,043 | 4/1975 | Tozer | 277/163 |
| 4,194,749 | 3/1980 | Benafons | 277/163 |
| 4,195,885 | 4/1980 | van Haren et al. | |
| 4,218,067 | 8/1980 | Halling | 277/236 |
| 4,369,980 | 1/1983 | Backlin | |
| 4,457,523 | 7/1984 | Hallling et al. | 277/236 |
| 4,477,057 | 10/1984 | Friess | 277/236 |
| 4,603,892 | 8/1986 | Abbes et al. | 277/236 |
| 5,201,534 | 4/1993 | Miyaoh | |
| 5,433,456 | 7/1995 | Nicholson | 277/164 |

FOREIGN PATENT DOCUMENTS

2241273 C2  8/1972  Germany.
3713071 C2  11/1987  Germany.

OTHER PUBLICATIONS

"Helicoflex" Catalogue, vol. 2/85.

Primary Examiner—Daniel G. DePumpo
Attorney, Agent, or Firm—Darby & Darby

[57] ABSTRACT

A gasket, which functions as a static radial seal, includes a first sealing ring disposed at a first predetermined distance from a longitudinal axis. A second sealing ring is disposed at a second predetermined distance from the longitudinal axis. The second distance is less than the first distance. The first and second sealing rings are made of metal. A common metal C-shaped casing envelopes the first and second sealing rings. The first and second sealing rings move between a relaxed position prior to installation and an engaged position after installation. The first and second sealing rings are positioned in the casing in the relaxed position and define a line that extends between the centers of the first and second sealing rings. This line is disposed at an oblique offset angle with respect to the longitudinal axis.

18 Claims, 6 Drawing Sheets

METAL GASKET

BACKGROUND OF THE INVENTION

1. Field of the Invention

This invention relates to a highly elastic sealing element of metal, or metal gasket, for the static, radial sealing of junctions and joints and in particular of flanged couplings.

2. Discussion of the Related Art

Elastic metal gaskets are compressed between surfaces to be sealed—or mating surfaces—and are elastically deformed in the process. In the gasket, the deformation creates a sealing pressure which increases up to a given point as the deformation progresses. For sealing static connections one can basically distinguish between two types of sealing devices.

For one, there are gaskets which lie flush against radial mating surfaces of the components to be connected and which are pressed together by an axial force. This is generally accomplished by a screw-on coupling. In this approach, the force of the screw-on action must be greater than the sum of the counterpressure force resulting from the internal pressure and the sealing force generated by the sealing pressure of the gasket. The integrity of the seal over time is a function of the gasket material used, the thermal expansion or the yield strain of the material or the tractive or compressive stress acting on the coupling for instance as a result of changes in the power applied in screwing the coupling together and thus in the compression force.

Then there are gaskets which lie flush against axial mating surfaces of two components to be connected and which are radially compressed between the latter. In this case the screw connection absorbs only the force of the internal pressure while the radial sealing force for the compression of the gasket is provided by the connecting hardware of the two components and is therefore basically independent of the axial connective force.

The state of the art has provided a multitude of gaskets suitable for either sealing method.

Nevertheless, as requirements become ever more demanding, the choice of sealing materials that lend themselves to the production of gaskets exposed to significant pressure differences or strong temperature fluctuations begins to dwindle rapidly and is often limited to metals.

A metal gasket usually consists of a material that is more easily deformable than that of the mating surfaces to be sealed. However, when pressed into position the gasket, while adapting to the shape of the mating surfaces, cannot compensate for major surface irregularities nor for additional deformative forces acting on the gasket since the deformability of a metal gasket is generally quite limited. This means that the use of metal gaskets is contingent on high surface quality of the mating surfaces and high precision in the geometry of the components.

For axial sealing purposes there exist more or less flexible metal gaskets which are adequate for meeting the aforementioned requirements. For example, there are flat dual-ring gaskets for axial sealing, such as those shown in Busak+Luyken's "Hélicoflex" catalog, vol. 2/85, pages 8, 9, 10 and 18. Among the drawbacks of this design, besides the aforementioned, significantly greater screw-on connective force required to obtain a tight seal, is the danger of damage to the mating surfaces due to the frontal arrangement of the mating surfaces at the end of a component where, during handling, they are exposed to all kinds of mechanical impact.

For radial sealing purposes there have been flexible metal gaskets the installation of which requires a reasonable amount of force for deforming the metal gasket. The radial mating surfaces are relatively well protected against mechanical impact and the attainable integrity of the seal is not affected by the power applied in screwing the components together nor by variations in the connective force.

Figure 5:
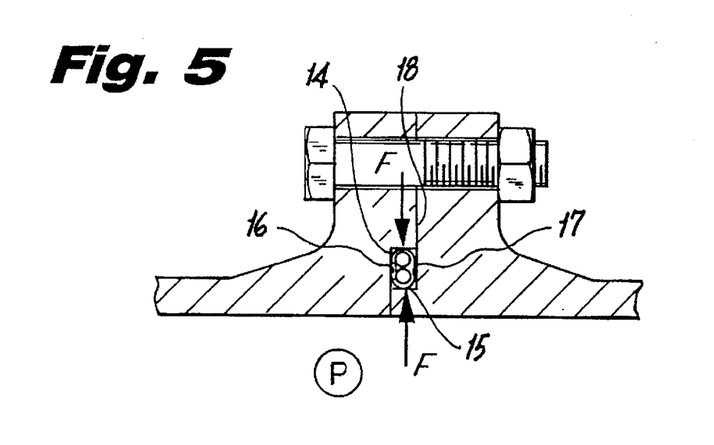
FIG. 5 shows the deformed gasket after completion of the assembly in the flange coupling.

For example, DE-C-22 41 273 shows in its FIG. 5 a metal gasket for radial sealing in which the gasket, as it is being pressed in place, is radially deformed by the cone-shaped element preceding the mating surface of a component and is forced against the companion component. DE-C-37 13 071 on its part describes assembly parameters for the cone-shaped element of an insert serving as a static radial seal and makes reference to a gasket marketed under the trade name "Hélicoflex".

The disadvantage of this type of gasket is that, when the coupling is assembled, the gasket must first be slipped onto a conical surface and then forced or compressed upon the latter to produce the initial radial stress necessary for obtaining a tight seal. The gasket then slides along at least one more sealing surface before the components are in their final position. Sliding the gasket onto the conical surface and on the sealing surface under full compressive stress conditions poses the danger of damage to the sealing or mating surface which promptly compromises or indeed negates the integrity of the seal. A particular problem is that it is not possible immediately after the assembly to determine whether and to what extent any damage was caused in the assembly process. When the coupling is disconnected, the gasket again slides along the sealing surface before it passes the cone and loses some of the compressive stress as it returns partly to its original shape. In general, however, when a gasket is mounted, it sustains a permanent plastic deformation and must be replaced. That in turn will be useful only if the sealing or mating surfaces are in good condition. If they are not, they must be reworked, i.e. resurfaced, which for instance in the case of pipeline flanges or cylinder head gaskets becomes a major project. Also, the friction involved in slipping on the gasket is such as to require a relatively strong effort in establishing the seal.

SUMMARY OF THE INVENTION

This invention is aimed at solving the problem created by the fact that the friction involved in the use of a flexible metal gasket for producing a static radial seal exposes the mating surfaces to possible damage by the gasket itself, so that a positive seal is not always ensured. Also, the seal is not necessarily reusable.

It is the objective of this invention to provide a flexible metal gasket for a static radial seal which avoids damage to the sealing surfaces during the installation process while establishing a reliably tight seal. This is also to be obtainable if the sealing element is to be reused after disconnection of the components without requiring any refinishing of the mating surfaces.

The main advantage offered by this invention is the avoidance of damage to the mating surfaces caused by sliding friction in the assembly process while sealing surfaces extending parallel with the direction of assembly are entirely adequate. A cone-shaped surface producing compressive stress in the gasket is no longer necessary. Also, lubricants or other means designed to reduce friction can be dispensed with. This is accomplished in that, in the initial phase of the assembly, the casing of the gasket lies loosely against the mating surfaces. During deformation, the casing does not change its position relative to the mating surfaces but instead presses against them. The radial compressive force of the seal is generated by virtue of the two sealing rings which are pushed one over the other inside the casing and which do not have room for a radial expansion due to the axial configuration of the mating or sealing surfaces. Since without particular sliding friction the sealing surfaces are not subjected to possible damage by the gasket, they may be reused without a problem after the coupling has been disconnected.

The deformation of the gasket assembly is the sum of the deformation of each individual sealing ring. Therefore, compared to other, conventional single-O-ring seals, this seal offers the advantage of having twice the elastic recovery capacity. This gasket system can be safely used at high and low temperatures as well as large pressure differentials. It combines high sealing power with long-life durability.

Using a casing that has a C-shaped cross section offers the advantage of increased sealing strength as a function of high pressure. The high pressure acting on the open side of the casing presses the gasket casing even more firmly against the sealing or mating surfaces, resulting in further enhanced integrity of the seal.

Using a casing of ductile material and sealing rings of elastic, non-ductile material provides good elastic properties of the gasket system, with the ductile casing compensating for rough spots and producing a snug fit and adaptation to the mating surfaces. Suitable materials for the casing include for instance aluminum, copper, silver or soft iron, but various other materials as well.

In the relaxed state, the sealing rings are offset in relation to each other at an angle $\alpha$ of 5° to 45° from the line perpendicular to the sealing surfaces. Within this range, the sealing rings will slide well one over the other, generating sufficient sealing pressure without causing the connective force applied in the assembly process to become excessive.

The casing holds the two sealing rings together in a way that they are in contact, either directly or through the interposition of other rigid elements, and thus support each other.

The integrity of the seal is further improved by a layer of ductile metal on the elastic casing. This layer is deformable under only light pressure and thus tightly hugs the opposite surface while compensating for rough spots. Usually the drawback of what may be too thick a ductile layer is its tendency to yield under a heavy load, a problem avoided by this design.

If the two sealing rings, or at least one of them, is provided with a layer having good sliding properties, there will be less friction during their superposition movement. The rings will slide more easily over one another and into alignment within the casing. With only a small amount of force applied in the assembly, the seal offers high radial compressive stress.

The simplicity of manufacture and the possibility to use commercially available sealing rings suggest the advantage of employing sealing rings having a circular cross section.

Conceivably, however, one could use sealing rings having a different cross section, for instance oval. These might be suitable for the replacement of conventional gaskets having nonstandard dimensions.

Incorporating obliquely offset sealing rings differing in thickness, offers the advantage that in the case of space limitations as they are often encountered for instance in the upgrading of existing seals, the concept of this invention lends itself to the solution. The deformation needed for the compressive stress may be limited to only one sealing ring. While in this case the superpositioning of the sealing rings does not take place up to one specific position in one plane, leaving axial forces which must be absorbed by the flange screw connection, the casing nevertheless hugs the mating surfaces in immovable fashion, preventing damage to these surfaces.

The use of hollow metal rings as sealing rings permits deformation with reduced force requirements.

Another way to change the deformation characteristics is the use of hollow metal rings with an opening. This produces a C-shaped profile, increasing the elasticity of the sealing rings and leaving the metal rings more room for deformation.

The openings in the metal rings are preferably located outside the load-bearing area of the gasket. In particular, they should not be located at the spot where the metal rings support each other or are supported by the casing since that would affect the sealing properties of the gasket system.

In a special design variation, the location of the openings is limited to a spot outside a very specific area. The restricted area extends around the connecting line of the centers of the sealing ring profiles and encompasses the sections on the circumference of the sealing rings which are defined by the angles a extending from the center in four directions. The connecting line is the main axis of force and the sections defined by the angle a constitute the available area for the superposition of the sealing rings in the assembly process.

Another design variation permits a change of the deformation characteristics of the sealing rings by means of a core in the form of a coil spring. This provides an inner resistance to the elastic or plastic deformation of the sealing rings. The use of a helical spring also has the advantage that its elasticity causes the gasket to press evenly and consistently against the mating or sealing surfaces, compensating for any deviations from an optimal geometry of the coupling. It also maintains its pressure over time. That pressure will be ensured by the elastic properties of the spring even in the event of minor dimensional changes such as those caused by a varying rate of thermal expansion.

BRIEF DESCRIPTION OF THE DRAWINGS

One design example of this invention is illustrated in the diagram and is described below in more detail.

DETAILED DESCRIPTION OF THE PREFERRED EMBODIMENT

Figure 1:
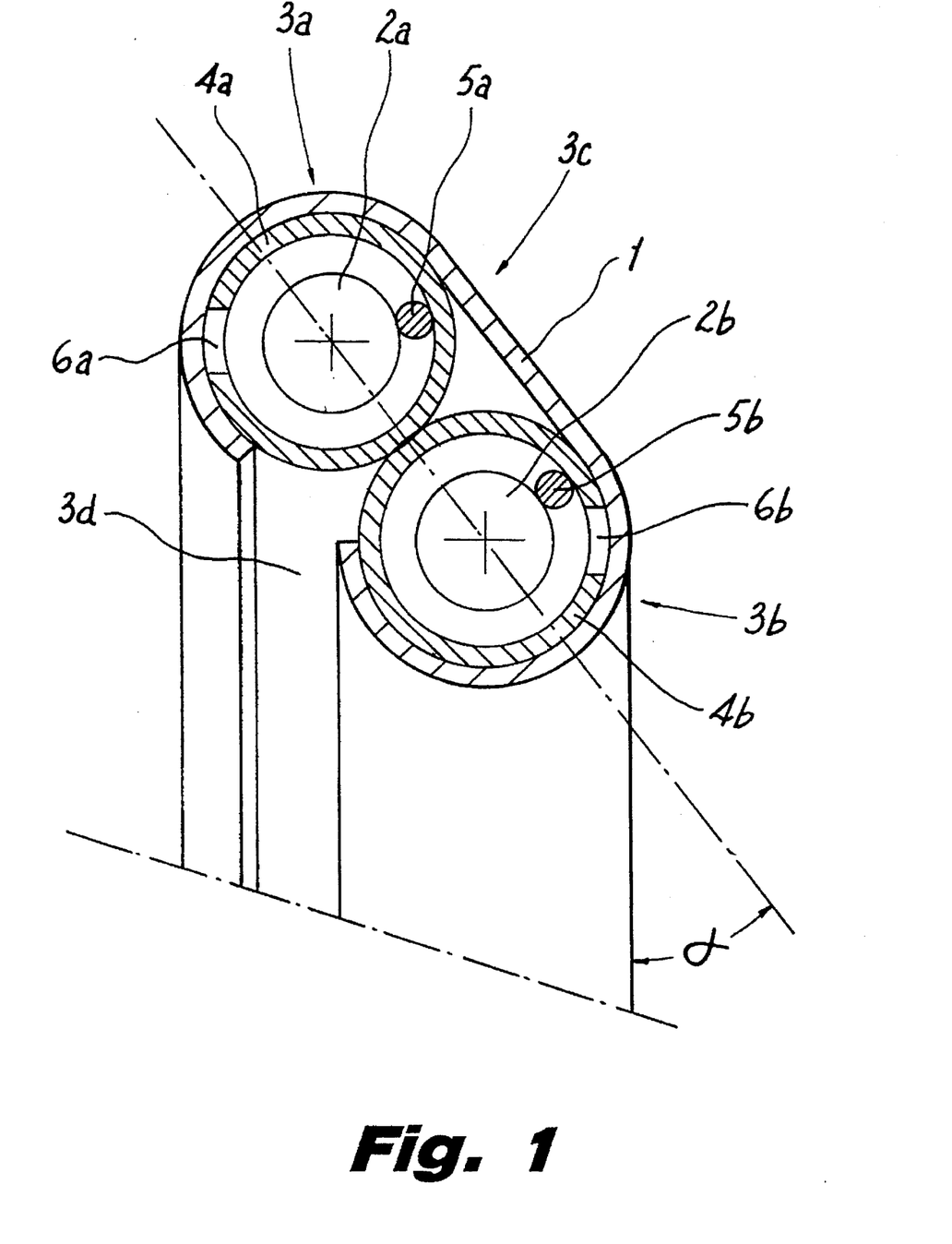
FIG. 1 shows the enlarged cross section of a particular gasket design.

FIG. 1 illustrates the structural concept of a gasket according to this invention. The casing (1) has a C-shaped profile divided into three sections. Two of these are circular segments (3a, 3b) connected by a straight line (3c). The straight line (3c) is part of the envelope surface of a cone, with the cone angle in this case being 104°. This angle is calculated using the formula 180°–2α. The C-shaped cross-sectional area produces on the side opposite the straight line (3c) an opening (3d) which extends over the entire length of the gasket. The casing (1) consists preferably of a ductile material and can adapt itself to the sealing or mating surfaces (14, 15) which will always display a certain technically inevitable surface roughness. If the casing (1) consists of an elastic material, it can be provided with a ductile metal coating.

The circular segments (3a, 3b) envelop the sealing rings (2a, 2b) and are in close contact with the latter.

The sealing rings (2a, 2b) are hollow metal rings (4a, 4b) in each of which a coil spring (5a, 5b) is embedded. The metal rings (4a, 4b) are made of a nonductile material. They perform the function of converting the elastic deformation of the gasket into a high level of sealing pressure. In the design example shown, this function is supported by the embedded coil spring (5a, 5b). The coil spring (5a, 5b) maintains the elasticity of the gasket even in the case of plastic deformation of the sealing rings (2a, 2b). The coil spring provides a high axial compressive force that prevents the helices from kicking out sideways under a shunt load during operation which would promptly break the seal since the sealing pressure would be lost.

When coil springs are used, the metal rings (4a, 4b), which are made of an elastic, nonductile material, prevent the helices of the coil spring (5a, 5b) from causing impressions in the ductile casing (1), since they transmit the forces emanating from the coil spring (5a, 5b) evenly onto the casing (1), causing the gasket assembly to consistently and continuously press against the mating surfaces.

The metal rings (4a, 4b) are not closed but have openings (6a, 6b) in the circumferential direction of the gasket. The openings (6a, 6b) are so aligned that they lie outside a restricted area (7a, 7b, 8a, 8b) illustrated in FIG. 2.

Since the gasket is shaped somewhat like a cone section, one sealing ring is larger than the other. In the design example shown, the sealing ring (2b) is smaller than the sealing ring (2a), and, in relation to the line perpendicular to the mating surfaces (14, 15), they are obliquely offset from each other by an angle α of 38°. The sealing rings (2a, 2b) are in direct contact and support each other.

The sealing rings (2a, 2b) may differ in thickness and their cross section may be other than circular, for instance oval, to meet special requirements.

Figure 2:
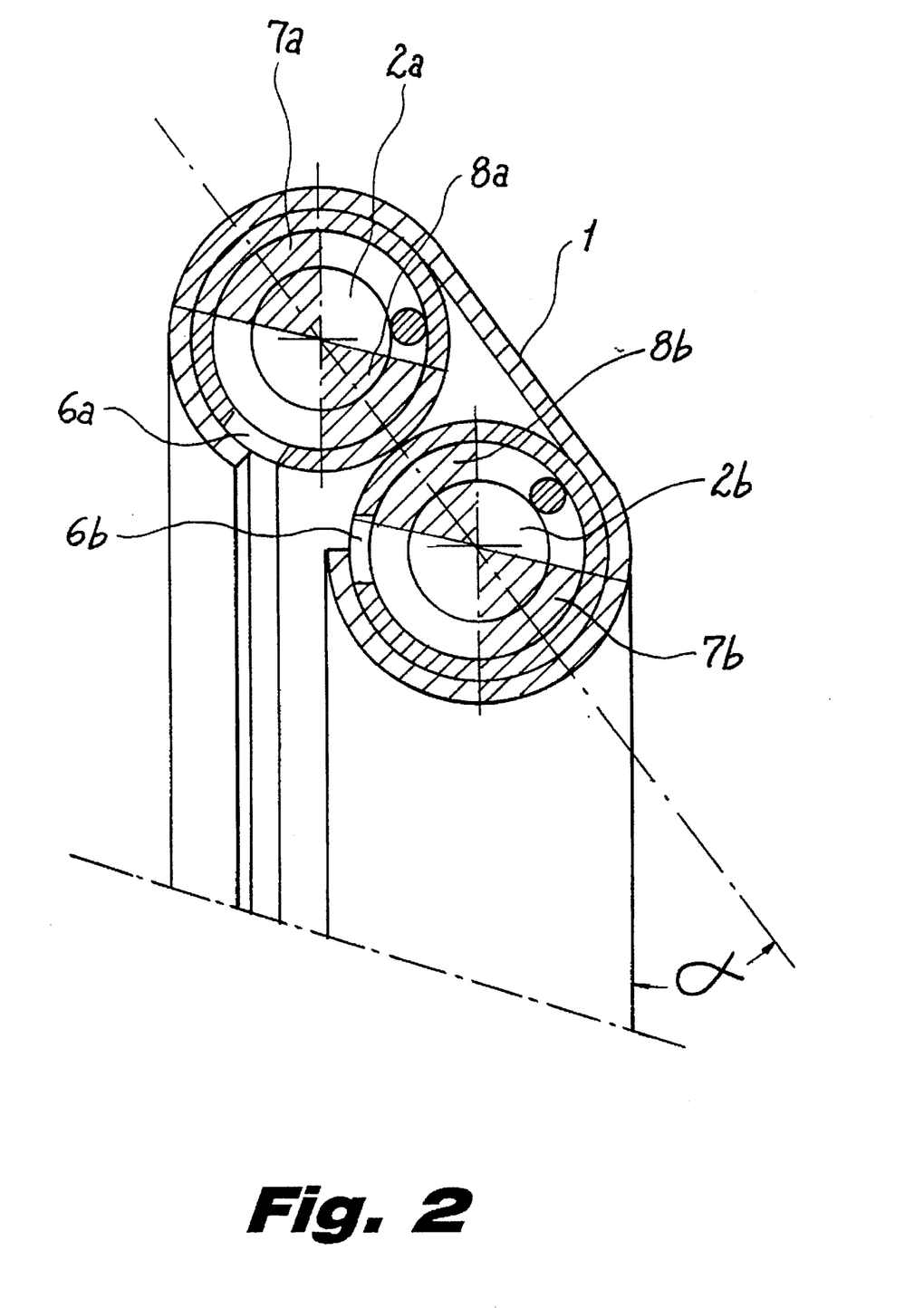
FIG. 2 shows the restricted area referred to in claim 13.

In FIG. 2, the areas (7a, 7b, 8a, 8b) of the sealing rings exposed to particular pressure loads are specially marked. These areas are the result of the unpredictability of the movements of the sealing rings (2a, 2b) when they are pushed one over the other during the assembly. In the process, the sealing rings (2a, 2b) may turn or slide on each other but in any event they will not change their position relative to each other beyond the area (8a, 8b). The points where the sealing rings (2a, 2b) are pressed against the casing (1) are likewise located in an area (7a, 7b), around the connecting line of the centers, into which the openings (6a, 6b) must not extend. The areas (7a, 7b, 8a, 8b) extend at an angle α around the connecting line of the centers of the sealing rings (2a, 2b), with the vertices of the respective angles α constituting the individual centers.

Figure 3:
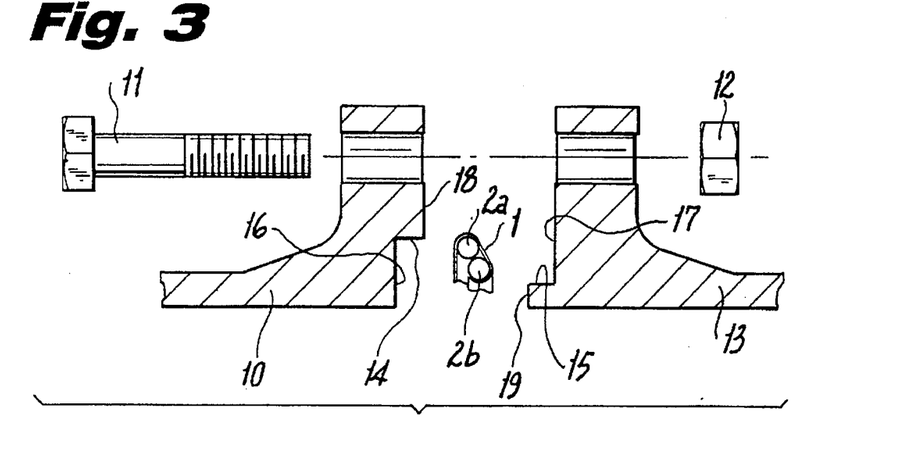
FIG. 3 shows the longitudinal section of a gasket prior to installation in a flange coupling.

The flexible gasket illustrated in FIG. 3 serves to seal a circular flange coupling. However, it could serve equally well in any conceivable application, for instance as a cylinder head gasket, wherever a radial, static seal is required. The gasket in this case consists of a casing (1) which holds together two sealing rings (2a, 2b) each with a circular cross section. The sealing rings (2a, 2b) are arranged in the casing (1) in an obliquely offset relation to each other.

The flange coupling consists of a stationary flange (10) which is to be connected with a movable flange (13) by means of mounting hardware (11, 12) distributed over its circumference. The flange coupling is radially sealed by means of the gasket. For this purpose, the flange (10) has a coaxial outer radial mating surface (14) and the flange (13) has a coaxial inner mating surface (15). Of necessity, the inner mating surface (15) has a smaller diameter than the outer mating surface (14). These diameters correspond respectively to the inner and outer diameters of the gasket.

The mating surfaces (14, 15) are delimited in the back by jogs (16, 17) in the flanges (10, 13) and extend all the way to the end surfaces (18, 19) of the flanges (10, 13). In other words, the outer sealing or mating surface (14) is located on a jog or step (16) recessed into the flange (10), the inner mating surface (15) is located on a jog (17) protruding from the flange (13).

Figure 4:
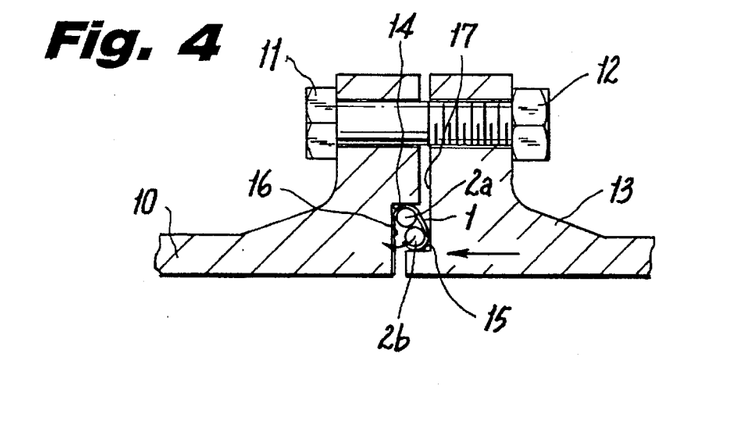
FIG. 4 shows one condition during assembly.

As shown in FIG. 4, the movable flange (13) is moved axially toward the fixed flange (10). The gasket is inserted between the two flanges (10, 13). In the process, the gasket which makes loose contact between its inside and the inner mating surface (15) and, respectively, between its one end face and the jog (17), penetrates into the fixed flange (10) where it makes loose contact between its outside and the outer mating surface (14) and, respectively, between its other end face and the jog (16). During this process, the sealing ring slides along the mating surfaces (14, 15), almost without touching them, all the way to the jogs (16, 17), without causing any possible damage. By means of the mounting hardware (11, 12) the necessary force is now applied that will cause the radial compression of the sealing rings for a positive radial seal.

This compression takes place in that the flange (13) is moved closer to the flange (10) until the condition depicted in FIG. 5 is reached. As the flange mounting hardware is tightened from the condition per FIG. 4 to that per FIG. 5, the gasket is pressed against the mating surfaces (14, 15). In the process, the sealing ring (2a) will slide over the sealing ring (2b), or the sealing ring (2b) will slide under the sealing ring (2a). The sealing rings (2a, 2b), obliquely offset in relation to each other, are pressed toward each other by the jogs (16, 17), i.e. they are moved from their obliquely offset position into a concentric position.

In the process, the casing (1) may undergo some deformation at point (3c) which, however, is of no consequence.

The sealing rings (2a, 2b) are elastically deformed before any additional plastic deformation could take place. The deformation of the sealing rings (2a, 2b) engenders a pressure force F acting on the mating surfaces (14, 15) and establishing the sealing effect. The alignment of the two sealing rings (2a, 2b) in one plane causes the axial forces to disappear, the gasket is under radial pressure only and the mounting hardware (11, 12) need not withstand any force other than the internal pressure P.

To protect the gasket from being squashed, the end surface (18) serves as a stop. This makes the sealing power independent of the compressive force of the flanges. The stop also ensures that the two sealing rings (2a, 2b) are aligned in one plane, maximizing the sealing effect. The casing of the gasket is C-shaped and its opening (3d) is so positioned that the internal pressure bears on the sealing rings (2a, 2b) and the casing (1), enhancing the sealing pressure.

During the deformation of the gasket, the casing (1) rests motionless against the mating surfaces (14, 15) and the jogs (16, 17); there is no relative movement between the casing (1) and the mating surfaces (14, 15) where they meet.

Figure 6:
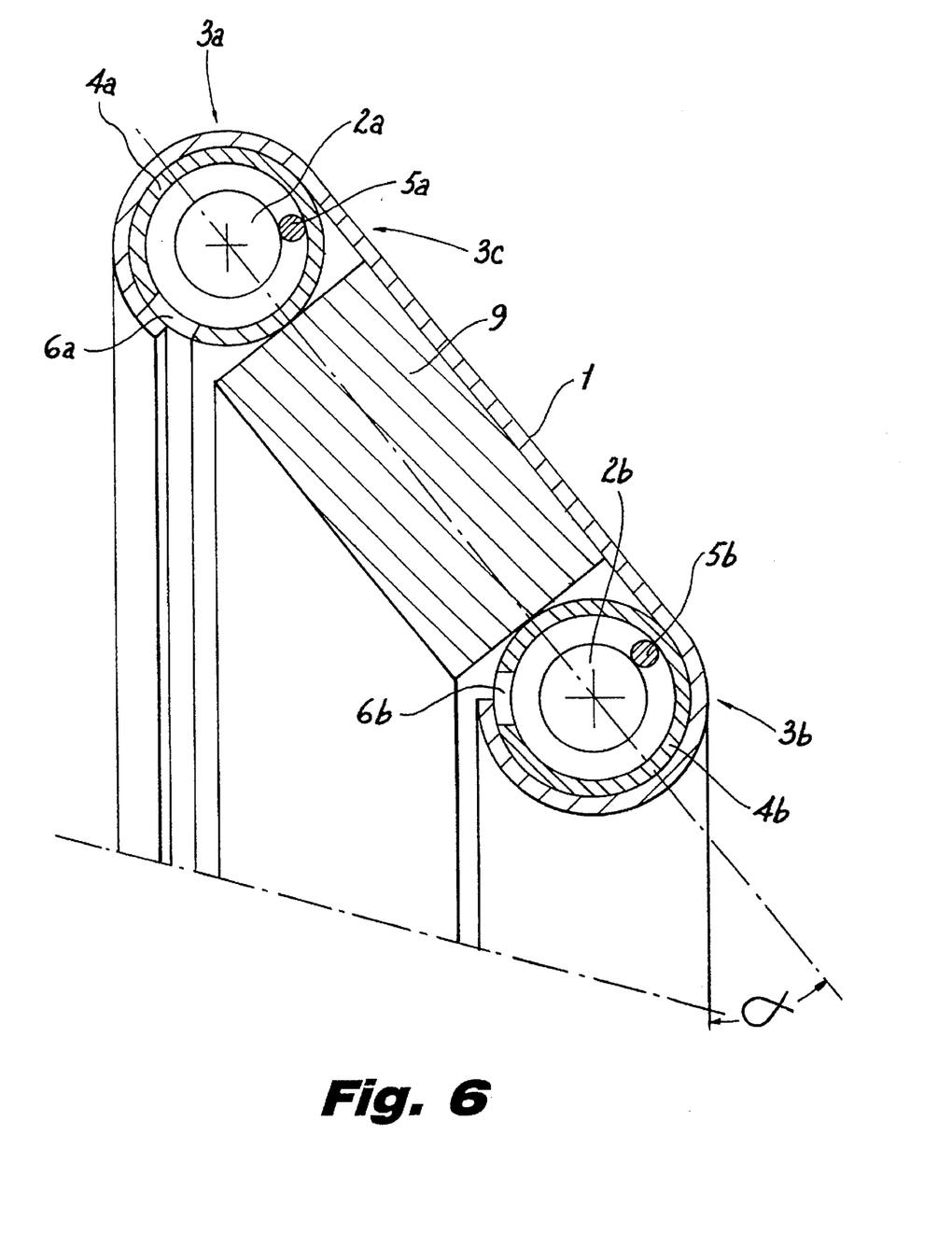
FIG. 6 shows the gasket with an internal rigid element.
Figure 7:
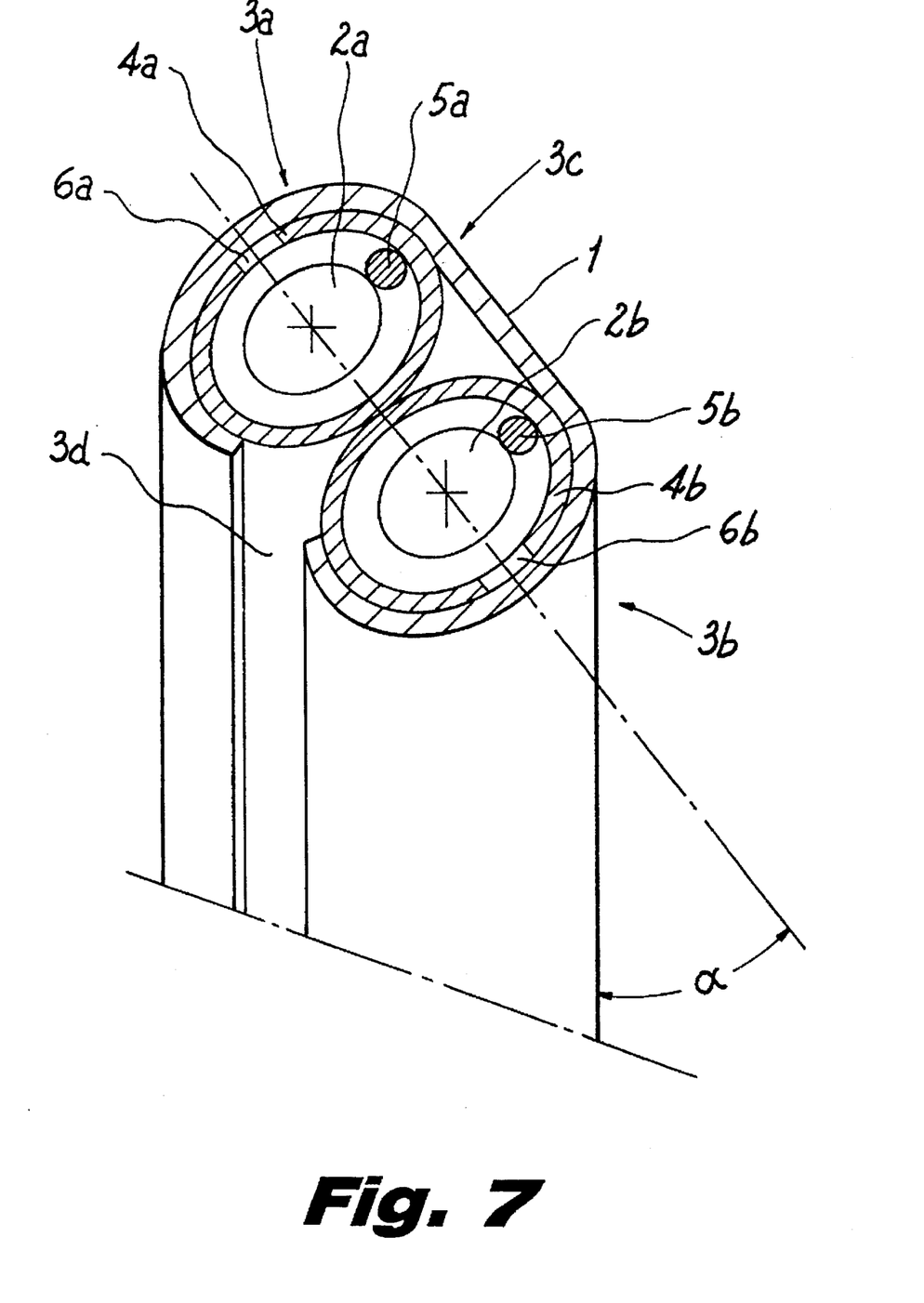
FIG. 7 shows an alternate embodiment.
Figure 8:
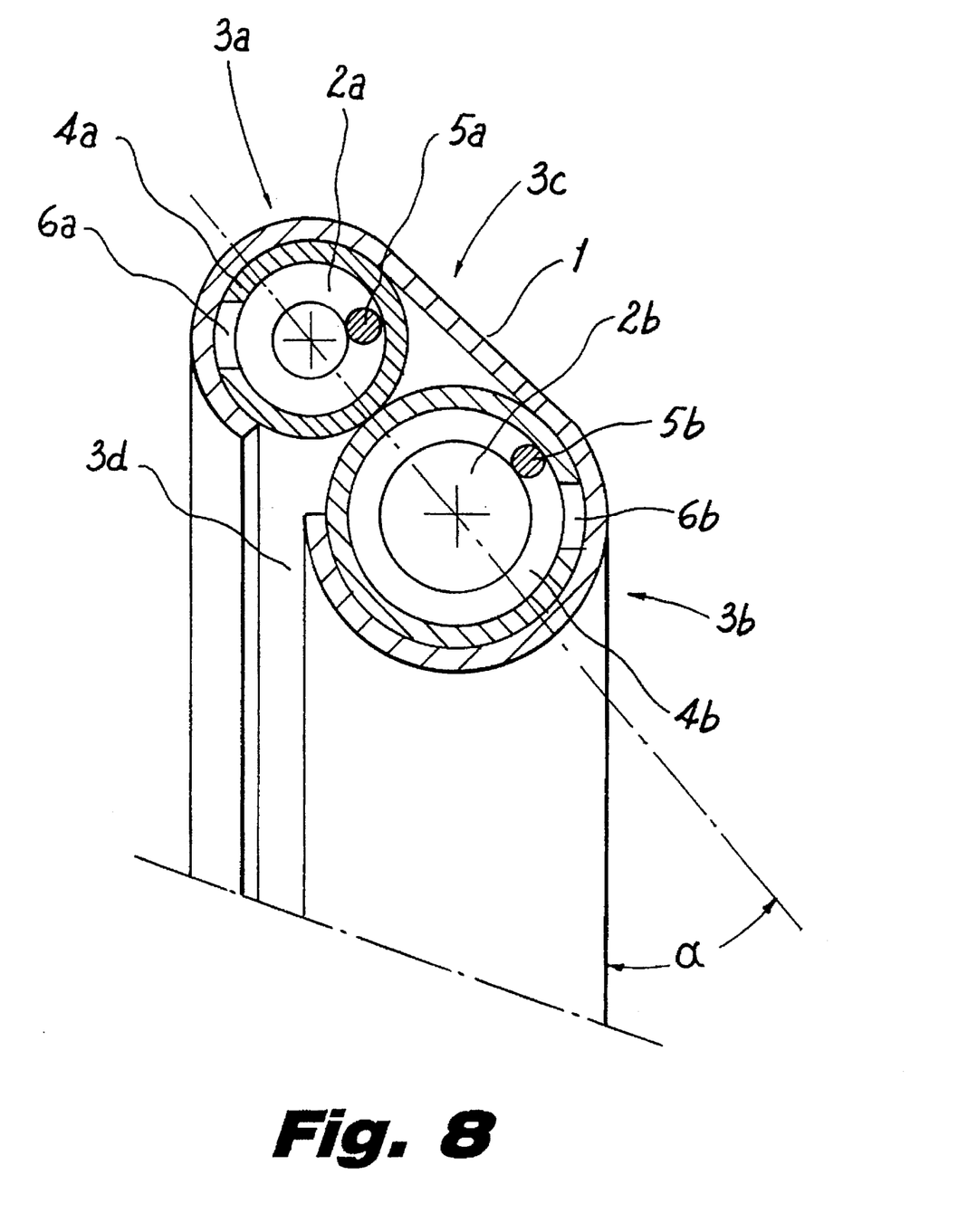
FIG. 8 shows an alternate embodiment.

FIG. 6 shows a gasket provided with a rigid element (9). The element (9) is positioned inside the casing (1) between the sealing rings (2a, 2b). The sealing rings (2a, 2b), when under pressure, butt against the element (9) and support each other via the latter. As shown in FIG. 7, the sealing rings may have an oval cross section. As shown in FIG. 8, the sealing rings may differ in thickness.

Apart from a circular design for a flange coupling, the gasket according to this invention can be produced in any other desired configuration. It lends itself particularly well to utilization at high or low temperatures and significant pressure differentials. This gasket can also be used where slow, minor axial displacements are involved, for instance through varying linear expansion caused by temperature fluctuations. This gasket provides a high-performance seal, is highly fire-resistant and offers long-life durability.

We claim:

1. A gasket, which functions as a static radial seal disposed about a longitudinal axis, comprising:

a first sealing ring disposed at a first predetermined distance from said longitudinal axis;

a second sealing ring disposed at a second predetermined distance from said longitudinal axis, said second distance being less than said first distance, said first and second sealing rings being made of metal;

a common metal C-shaped casing enveloping said first and second sealing rings, wherein said first and second sealing rings move between a relaxed position prior to installation and an engaged position after installation, said first and second sealing rings being positioned in the casing in the relaxed position so as to define a line extending between the centers of the first and second sealing rings, said line is disposed at an oblique offset angle with respect to said longitudinal axis.

2. A gasket as in claim 1, wherein the casing has an open end that is located on a high-pressure side of the gasket.

3. A gasket as in claim 1, wherein the casing consists of a ductile material and the sealing rings consist of an elastic, nonductile material, said casing is more ductile than the sealing rings and the sealing rings are more elastic than the casing.

4. A gasket as in claim 1, wherein in the relaxed position, the first and second sealing rings are positioned in an oblique relation to each other at an angle α of from 5° to 45° relative to a line perpendicular to the longitudinal axis.

5. A gasket as in claim 1, wherein in the engaged position, the first and second sealing rings are directly in contact with each other.

6. A gasket as in claim 1, wherein the casing consists of an elastic material coated with a layer of ductile material.

7. A gasket as in claim 1, wherein at least one of the sealing rings is coated with a layer that reduces the friction between the first and second sealing rings and between the coated ring and the casing.

8. A gasket as in claim 1, wherein the first and second sealing rings have a circular profile.

9. A gasket as in claim 1, wherein the first and second sealing rings have an oval profile.

10. A gasket as in claim 1, wherein the first and second sealing rings differ from each other in thickness.

11. A gasket as in claim 1, wherein at least one of the sealing rings is designed as a metal ring having a hollow cross section.

12. A gasket as in claim 11, wherein at least one of the metal rings is C-shaped, having an open end.

13. A gasket as in claim 12, wherein the open ends of the metal rings are at all times located outside an area in which the metal rings are subjected to radial pressure.

14. A gasket as in claim 13, wherein the open ends are located outside an area which is delimited by four sections formed in each case by an angle α on both sides of a straight line connecting the centers of the metal rings, with the vertices of the angles constituting the centers of the metal rings.

15. A gasket as in claim 11, wherein at least one of the first and second sealing rings contains a core in the form of a self-contained coil spring of metal wire with contiguous helices, providing a high axial compressive force.

16. A gasket as in claim 1, wherein in the engaged position, the first and second sealing rings are in contact with each other via a rigid element disposed between said first sealing ring and said second sealing ring.

17. A gasket as in claim 1, wherein the first and second sealing rings differ from each other in profile.

18. A gasket as in claim 1, wherein in the engaged position the line extending between the centers of the first and second sealing rings is disposed perpendicularly with respect to said longitudinal axis.

* * * * *